United States Patent
Li

(10) Patent No.: US 9,986,087 B2
(45) Date of Patent: May 29, 2018

(54) METHODS OF SHARING A WIFI HOTSPOT AND ASSOCIATED ELECTRONIC DEVICES

(71) Applicant: Huizhou TCL Mobile Communication Co., Ltd, Huizhou, Guangdong (CN)

(72) Inventor: Xin Li, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 0 days. days.

(21) Appl. No.: 15/377,769

(22) Filed: Dec. 13, 2016

(65) Prior Publication Data

US 2017/0094054 A1    Mar. 30, 2017

Related U.S. Application Data

(63) Continuation of application No. PCT/CN2016/079249, filed on Apr. 14, 2016.

(30) Foreign Application Priority Data

Aug. 3, 2015  (CN) .......................... 2015 1 0483965

(51) Int. Cl.
*H04M 3/42* (2006.01)
*H04L 29/12* (2006.01)
(Continued)

(52) U.S. Cl.
CPC .... *H04M 3/42153* (2013.01); *H04L 61/6068* (2013.01); *H04W 84/12* (2013.01); *H04W 88/02* (2013.01)

(58) Field of Classification Search
CPC .......... H04M 3/42153; H04L 61/6068; H04W 84/12
(Continued)

(56) References Cited

U.S. PATENT DOCUMENTS

2005/0286466 A1* 12/2005 Tagg ................... H04L 12/2856
370/329
2012/0040606 A1* 2/2012 Verfuerth ........... H05B 37/0218
455/7
(Continued)

FOREIGN PATENT DOCUMENTS

CN        103096384 A      5/2013
CN        104427537 A      3/2015
(Continued)

OTHER PUBLICATIONS

International Search Report on corresponding PCT application (PCT/CN2016/079249) from International Searching Authority (CN) dated Jul. 5, 2016.

*Primary Examiner* — Nghi H Ly
(74) *Attorney, Agent, or Firm* — Cheng-Ju Chiang

(57) ABSTRACT

Methods of sharing a WiFi hotspot are disclosed. The method includes: receiving, at a master device, a hotspot sharing request from a slave device; responding, by the master device, to the hotspot sharing request and collecting its current resource information; determining, by the master device, whether the slave device is permitted to access the WiFi hotspot of the master device based on the current resource information; if yes, transmitting, by the master device, a first notification message to the slave device to advise that it is permitted to join the WiFi hotspot, and initializing the WiFi hotspot to prepare for adding the slave device to the WiFi hotspot. Also disclosed is an electronic device.

20 Claims, 6 Drawing Sheets

(51) Int. Cl.
  *H04W 84/12*    (2009.01)
  *H04W 88/02*    (2009.01)
(58) Field of Classification Search
  USPC ........... 455/414.1, 41.1, 41.2, 418, 421, 518
  See application file for complete search history.

(56)            References Cited

U.S. PATENT DOCUMENTS

2012/0057456  A1*  3/2012  Bogatin ............... H04W 28/08
                                                370/230.1
2015/0189547  A1   7/2015  Forssell

FOREIGN PATENT DOCUMENTS

CN         105072670 A      11/2015
WO    WO2013178254 A1       12/2013

* cited by examiner

METHODS OF SHARING A WIFI HOTSPOT AND ASSOCIATED ELECTRONIC DEVICES

CROSS-REFERENCE TO RELATED APPLICATIONS

This is a continuation of International Application No. PCT/CN2016/079249 filed Apr. 14, 2016, designating the United States and claiming priority with respect to Application No. 201510483965.5 filed in China on Aug. 3, 2015, the contents of all of which are hereby incorporated by reference.

TECHNICAL FIELD

The present disclosure generally relates to communications technology, and in particular relates to methods of sharing a WiFi spot and associated electronic devices.

BACKGROUND

The world has stepped into the era of mobile Internet. Simultaneously, it is becoming increasingly common for smart electronic devices to include Wi-Fi (Wireless Fidelity) as a standard feature. Thus, to make full use of the data charges, one electronic device can be used as a WiFi hotspot, to which multiple devices can be connected and share the wireless Internet access. However, because the electronic device's hardware and software resources are limited, multiple devices already connected to the hotspot may compete for the bandwidth so that later devices would be unable to join the hotspot or access the external network. For the latter, even though the device is apparently connected to the hotspot, it may still be unable to access the external network, severely affecting the user experience.

In view of the above, there is a need to provide methods of sharing a WiFi hotspot and associated electronic devices to address the above issues.

SUMMARY

Embodiments of the present disclosure provide methods of sharing a WiFi hotspot and associated electronic devices, which can issue notifications to inform whether the user is able to join the WiFi hotspot.

There is provided an electronic device that comprises a master and a slave device, the master device comprising a processor, a memory, a transceiver, and a bus, where the processor, memory, and transceiver are coupled to the bus respectively, the memory may be configured to store a program, the transceiver may be configured to receive a hotspot sharing request from the slave device, and the processor may be configured to execute the program, the program being configured to:

respond to the hotspot sharing request and collect current resource information of the master device, the current resource information comprising one or more values selected from among at least one of a number of slave devices connected to the WiFi hotspot of the master device, temperature, and battery discharge rate of the master device;

determining whether the one or more the selected values exceed a corresponding preset threshold;

if none of the one or more selected values exceed the corresponding preset threshold, determine the slave device is permitted to access the WiFi hotspot, while the transceiver may further configured to transmit a first notification message to the slave device to advise the slave device that the slave device is permitted to join the WiFi hotspot;

initialize the WiFi hotspot to prepare for adding the slave device to the WiFi hotspot;

if any one of the one or more selected values exceed the corresponding preset threshold, determine the slave device is not permitted to access the WiFi hotspot, while the transceiver may further configured to transmit a second notification message to the slave device to alert the slave device that it is not permitted to access the WiFi hotspot; and hide the WiFi hotspot from the slave device.

The current resource information may further comprise a signal strength of the master device, and the program may further be configured to determine whether the signal strength of the master device is greater than a preset signal strength if none of the one or more selected values exceed the corresponding preset threshold; and if the signal strength of the master device is determined as greater than the preset signal strength, determine the slave device is permitted to join the WiFi hotspot.

The current resource information may further comprise a distance of the slave device from the master device, and the program may further be configured to determine whether the distance is smaller than a preset distance if none of the one or more selected values exceed the corresponding preset threshold; and if the distance is determined as smaller than the preset distance, determine the slave device is permitted to join the WiFi hotspot.

Also provided is a method of sharing a WiFi hotspot, the method comprising: receiving, at a master device, a hotspot sharing request from a slave device; responding, by the master device, to the hotspot sharing request and collecting its current resource information, the current resource information comprising one or more values selected from among at least one of a number of slave devices connected to the WiFi hotspot of the master device, temperature, and battery discharge rate of the master device; determining, by the master device, based on the current resource information whether the slave device is permitted to access the WiFi hotspot; if determining the slave device is permitted to access the WiFi hotspot, transmitting, by the master device, a first notification message to the slave device that it is permitted to join the WiFi hotspot, and initializing the WiFi hotspot to prepare for adding the slave device to the WiFi hotspot.

The method may further comprise: if determining the slave device is not permitted to access the WiFi hotspot, transmitting, by the master device, a second notification message to the slave device that it is not permitted to access the WiFi hotspot, and hiding the WiFi hotspot from the slave device.

Determining whether the slave device is permitted to access the WiFi hotspot may comprise: determining, by the master device, whether the one or more selected values exceed a corresponding preset threshold; and if none of the one or more selected values exceed the corresponding preset threshold, determining the slave device is permitted to join the WiFi hotspot.

The current resource information may further comprise a signal strength of the master device, and the method may further comprise, after determining that none of the one or more selected values exceed the corresponding preset threshold: determining, by the master device, whether the signal strength of the master device is greater than a preset signal strength; and if the signal strength is determined as greater than the preset signal strength, determining the slave device is permitted to join the WiFi hotspot.

The current resource information may further comprise a distance of the slave device from the master device, and the method may further comprise, after determining that none of the one or more selected values exceed the corresponding preset threshold: determining, by the master device, whether the distance is smaller than a preset distance; and if the distance is determined as smaller than the preset distance, determining the slave device is permitted to join the WiFi hotspot.

Also provided is an electronic device that comprises a master and a slave device, the master device comprising: a receiving device configured to receive a hotspot sharing request from the slave device; a resource collection device configured to respond to the hotspot sharing request and collect current resource information of the master device, the current resource information comprising one or more values selected from among at least one of a number of slave devices connected to a WiFi hotspot of the master device, temperature, and battery discharge rate of the master device; a determination device configured to determine based on the current resource information whether the slave device is permitted to access the WiFi hotspot; a transmitting device configured to transmit a first notification message to the slave device that it is permitted to join the WiFi hotspot if the determination device determines the slave device is permitted to access the WiFi hotspot; and an initialization device configured to initialize the WiFi hotspot to prepare for adding the slave device to the WiFi hotspot.

The master device may further comprise a concealment device. The transmitting device may further be configured to transmit a second notification message to the slave device that it is not permitted to access the WiFi hotspot if the determination device determines the slave device is not permitted to access the WiFi hotspot, while the concealment device may be configured to hide the WiFi hotspot of the master device from the slave device if the determination device determines the slave device is not permitted to access the WiFi hotspot.

The determination device may comprise a threshold comparison device configured to determine whether the one or more selected values exceed a corresponding preset threshold; and, if none of the one or more selected values exceed the corresponding preset threshold, determine the slave device is permitted to join the WiFi hotspot.

The current resource information may further comprise a signal strength of the master device, and the determination device may further comprise a signal strength comparison device configured to, after the threshold comparison device determines that none of the one or more selected values exceed the corresponding preset threshold, determine whether the signal strength of the master device is greater than a preset signal strength; and if the signal strength is determined as greater than the preset signal strength, determine the slave device is permitted to join the WiFi hotspot.

The current resource information may further comprise a distance of the slave device from the master device, and the determination device may further comprise a distance comparison device configured to, after the threshold comparison device determines that none of the one or more selected values exceed the corresponding preset threshold, determine whether the distance is smaller than a preset distance; and if the distance is determined as smaller than the preset distance, determine the slave device is permitted to join the WiFi hotspot.

According to the method of sharing a WiFi hotspot provided by the present disclosure, the master device may respond to a hotspot sharing request received from a slave device and collect its current resource information, determine based on the current resource information whether the slave device is permitted to access the WiFi hotspot of the master device. If yes, the master device may send a first notification message to the slave device to advise that it is permitted to join the WiFi hotspot and may simultaneously initialize the WiFi hotspot to prepare for adding the slave device to the WiFi hotspot. Therefore, the master device can transmit in time a notification message to the slave device after confirming that the slave device is permitted to join the WiFi hotspot, avoiding the issue that the slave device is unable to access the external network though it is apparently added to the WiFi hotspot.

DETAILED DESCRIPTION

To render the objectives, technical solutions, and advantages of the disclosure definite and unambiguous, hereinafter the disclosure will be described in greater detail in connection with particular embodiments and the accompanying drawings. It, however, can be appreciated that the particular embodiments discussed are merely intended to better illustrate but not to limit the present disclosure.

Figure 1:
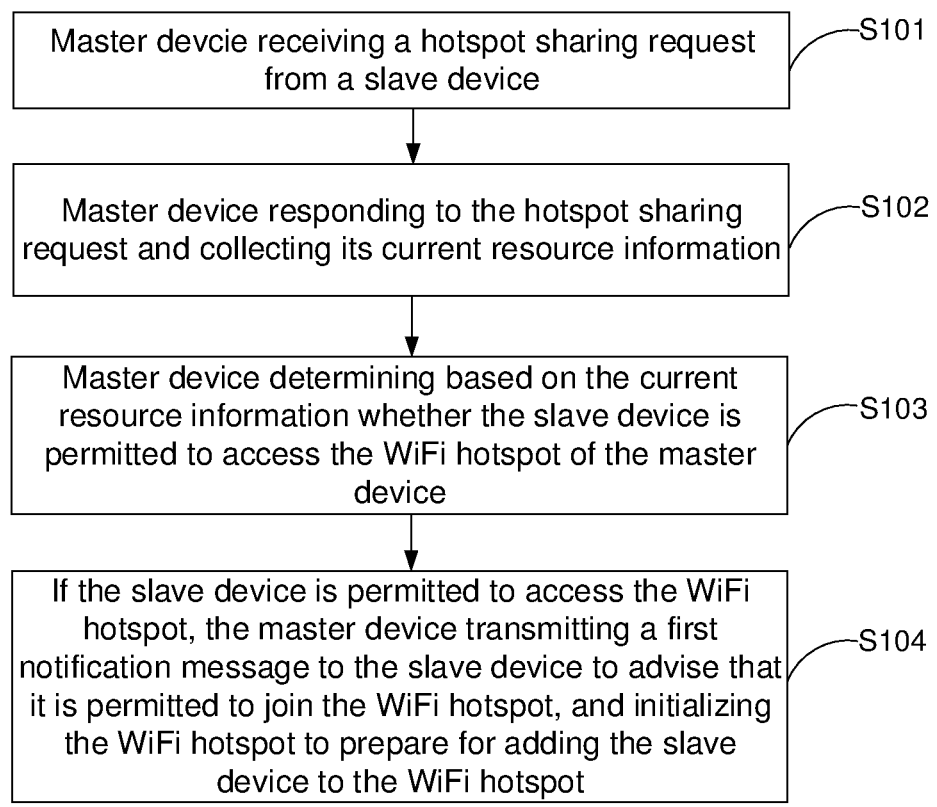
FIG. 1 is a flow chart illustrating a first embodiment of a method of sharing a WiFi hotspot according to the disclosure.

FIG. 1 is a flow chart illustrating a first embodiment of a method of sharing a WiFi hotspot according to the disclosure. The method may comprise the following blocks.

In S101, a master device may receive a hotspot sharing request from a slave device.

In S102, the master device may respond to the hotspot sharing request and collect its current resource information.

The current resource information may comprise at least one of processing capacity of the master device's controller, usage of hardware resources, and processing power of the master device's WiFi chip. Among them, the processing capacity of the master device's controller may comprise at least one of the master device's multithreading capacity, capability utilization rate, encryption ability utilization rate, and storage usage rate. The processing power of the master device's WiFi chip may comprise at least one of its data throughput, packet retransmission rate, and packet delay rate. The usage of hardware resources may comprise at least one of a number of slave devices connected to the WiFi hotspot of the master device, the temperature, and the battery discharge rate of the master device.

In S103, the master device may determine whether the slave device is permitted to access the WiFi hotspot based on the current resource information.

In particular, the master device may determine whether the slave device is permitted to access the WiFi hotspot based on at least one of the processing capacity of the master device's controller, the usage of hardware resources, and the processing power of the master device's WiFi chip. Typically, the master device may achieve the above purpose by determining whether one or more values selected from among at least one of the number of the slave devices connected to the master device, the temperature, and the battery discharge rate of the master device exceeds the corresponding preset threshold. If the master device determines that none of the one or more selected values exceed the corresponding preset threshold, it may determine that the slave device is permitted to be added to the WiFi hotspot of the master device.

For efficiency, the master device may select only a single value from among the number of the slave devices connected to the master device, the temperature, and the battery discharge rate of the master device, and determine whether the single selected value exceeds the corresponding preset threshold, and if no, the slave device may be permitted to access the WiFi hotspot of the master device. Or, the master device may select two values from among the number of the slave devices connected to the master device, the temperature, and the battery discharge rate of the master device, and, likewise, determine whether both values exceed the corresponding preset thresholds respectively, and if neither, the slave device may be permitted to access the WiFi hotspot.

In the current embodiment, the preset threshold may comprise a preset numeral threshold, and the master device may determine whether the number of slave devices connected to the master device exceeds the preset numeral threshold. The preset numeral threshold may be associated with the data traffic and bandwidth plan the master device subscribes to. In particular, the larger the data traffic and bandwidth subscription plan, the greater the preset numeral threshold. It is understood that the preset numeral threshold may also be associated with the mobile communications technology the master device employs. For example, if the master device uses a 2G (second-generation wireless telephone technology) network, the preset numeral threshold may not exceed a first value; if the master device uses a 3G (third-generation mobile telecommunications technology), the preset numeral threshold may not be larger than a second value; and if a 4G (fourth-generation mobile telecommunications technology) network is used, then the preset numeral threshold may not surpass a third value. Typically, the third value may be greater than the second value, which may in turn be greater than the first value. The preset numeral threshold can of course be defined alternatively by the user.

It can be understood that in other embodiments, the master device may also base on at least one of its multi-threading capacity, encryption ability utilization rate, storage usage rate, WiFi chip data throughput, WiFi chip packet retransmission rate, and WiFi chip packet delay rate to determine whether the slave device is permitted to join the WiFi hotspot.

In S104, if the master device determines the slave device is permitted to join the WiFi hotspot, it may transmit a first notification message to the slave device to notify that it is permitted to join the WiFi hotspot, and may accordingly initialize its WiFi hotspot to prepare for adding the slave device to the WiFi hotspot.

Once the slave device is permitted to join the WiFi hotspot, the master device may add a new communication path and reallocate the data traffic and bandwidth, and further distribute an even share of data traffic and bandwidth to the slave device through the newly added communication path. More specifically, assume there are 4 slave devices already connected to the WiFi hotspot of the master device, when the total data traffic and bandwidth may be distributed evenly to all 4 slave devices; now if a new slave device is also to join the WiFi hotspot, then the master device may add a new communication path and reallocate the data traffic and bandwidth, thus again distributing the total data traffic and bandwidth evenly to the total 5 slave devices through the total of 5 communication paths.

Further, if the slave device is permitted to join the WiFi hotspot of the master device, the master device may detect the performance of the slave device, and, if a superior performance is detected, i.e., less interference, then a comparatively smaller amount of data traffic or bandwidth may be allocated to the slave device, since the slave device may be able to achieve reliable communication with a small amount of communications resources when there is less interference. In contrast, if an inferior performance is detected, i.e., a high level of interference, then a comparatively greater amount of data traffic or bandwidth may be distributed to the slave device, so that the slave device can also achieve reliable communication with a greater amount of communications resources when there is much interference.

On the other hand, if the master device determines that the number of the slave devices connected to the WiFi hotspot exceeds the corresponding preset threshold, then the slave device may not be permitted to join the WiFi hotspot and a second notification message may be transmitted to the slave device to alert that it is not permitted to access the WiFi hotspot.

Figure 2:
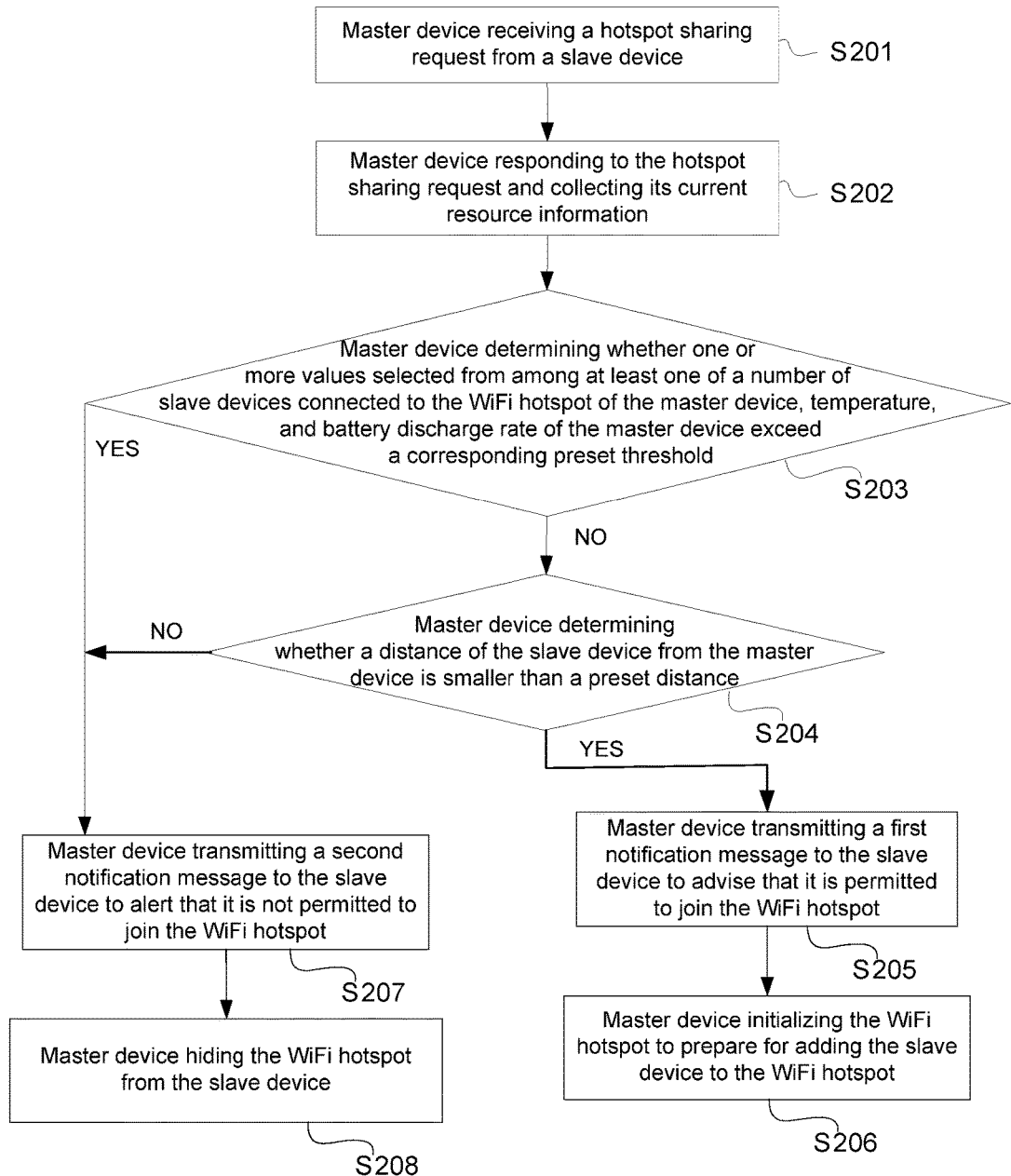
FIG. 2 is a flow chart illustrating a second embodiment of a method of sharing a WiFi hotspot according to the disclosure.

FIG. 2 is a flow chart illustrating a second embodiment of a method of sharing a WiFi hotspot according to the disclosure. The method may comprise the following blocks.

In S201, a master device may receive a hotspot sharing request from a slave device.

In S202, the master device may respond to the hotspot sharing request and collect its current resource information.

The current resource information may comprise a number of slave devices connected to the WiFi hotspot, as well as a distance of the slave device from the master device.

In S203, the master device may determine whether the number of the slave device joining the WiFi hotspot exceeds a corresponding preset threshold.

If the master device determines the number doesn't exceed the corresponding preset threshold, then block S204 may be carried out, in which the master device may determine whether the distance is smaller than a preset distance. Typically, the preset distance may be chosen as a half of the WiFi transmission distance in general, e.g., if the WiFi transmission distance ranges from 10-30 meters, then the preset distance would range from 5-15 meters.

It can be understood that in other embodiments, if the master device determines the number of slave devices connected to the WiFi hotspot doesn't exceed the corresponding preset threshold or the distance is smaller than the preset distance, it may further detect the temperature of the master device and determine whether the temperature is higher than a preset temperature—if yes, the slave device may be prohibited from accessing the WiFi hotspot; if no, the slave device may be permitted to join the WiFi hotspot, following which block S205 may be entered. Or, if the temperature of the master device doesn't exceed the preset temperature, it may further measure its battery discharge rate and determine whether the battery discharge rate exceeds a preset charge value—if yes, the slave device may be prohibited from accessing the WiFi hotspot; if no, the slave device may be permitted to join the WiFi hotspot, following which block S205 may be entered. For simplicity, either of the temperature and battery discharge rate of the master device may be based on to determine whether the slave device is permitted to access the WiFi hotspot.

If the distance is determined as smaller than the preset distance, then block S205 may be carried out, in which the master device may transmit a first notification message to the slave device to advise the slave device that it is permitted to join the WiFi hotspot.

In S205, when transmitted to the slave device, the first notification message may be popped up in the form of a window and used to notify the user that the slave device is permitted to access the WiFi hotspot.

In S206, the WiFi hotspot of the master device may be initialized to prepare for adding the slave device to the WiFi hotspot.

Initializing of the WiFi hotspot may comprise adding a new communication path and reallocating the total data traffic and bandwidth.

If the master device determines the number of the slave devices connected to the WiFi hotspot exceeds the corresponding preset threshold and the distance is not smaller than the preset distance, then block S207 may be entered, in which a second notification message may be transmitted to the slave device to alert the slave device that it is not permitted to join the WiFi hotspot.

In S208, the WiFi hotspot may be kept hidden from the slave device.

Additionally, in other embodiments, the current resource information may further comprise a signal strength of the master device. If the distance is determined as smaller than the preset distance, then the master device may further determine whether the signal strength is greater than a preset signal strength, and if the signal strength is greater than the preset signal strength, block S205 may be executed; otherwise block S207 may be turned to.

Figure 3:
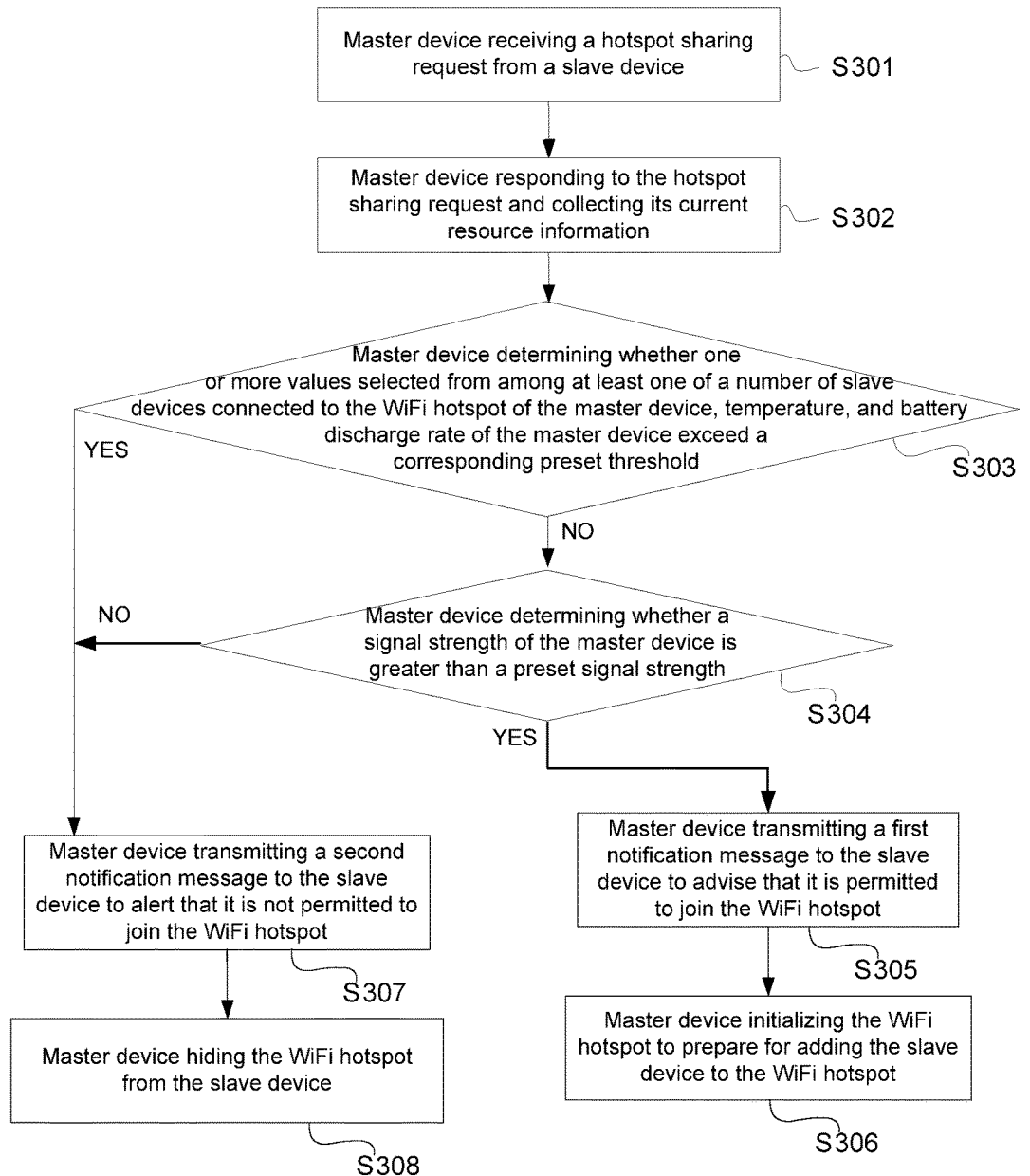
FIG. 3 is a flow chart illustrating a third embodiment of a method of sharing a WiFi hotspot according to the disclosure.

FIG. 3 is a flow chart illustrating a second embodiment of a method of sharing a WiFi hotspot according to the disclosure. The method may comprise the following blocks.

In S301, a master device may receive a hotspot sharing request from a slave device.

In S302, the master device may respond to the hotspot sharing request and collect its current resource information.

The current resource information may comprise a number of slave devices connected to the WiFi hotspot, as well as a signal strength of the master device.

In S303, the master device may determine whether the number of the slave device connected to the WiFi hotspot exceeds a corresponding preset threshold.

If the master device determines the number doesn't exceed the corresponding preset threshold, then block S304 may be carried out, in which the master device may determine whether the signal strength of the master device is greater than a preset signal strength. The main purpose of the current block is to detect whether signals can flow smoothly from and to the master device. If there is a smooth flow of signals, it may denote a superior signal strength and small amount of interference, thus the data traffic and bandwidth can be readily accessed.

It can be understood that in other embodiments, if the master device determines the number of slave devices connected to the WiFi hotspot doesn't exceed the corresponding preset threshold and the signal strength is greater than the preset signal strength, it may further measure its temperature and determine whether the temperature is higher than a preset temperature—if yes, the slave device may be prohibited from accessing the WiFi hotspot; if no, the slave device may be permitted to join the WiFi hotspot, following which block S305 may be entered. Or, if the temperature of the master device doesn't exceed the preset temperature, it may further measure its battery discharge rate and determine whether the battery discharge rate exceeds a preset charge value—if yes, the slave device may be prohibited from accessing the WiFi hotspot; if no, the slave device may be permitted to join the WiFi hotspot, following which block S305 may be entered. For simplicity, either of the temperature and battery discharge rate of the master device may be based on to determine whether the slave device is permitted to access the WiFi hotspot.

If the signal strength is determined as greater than the preset signal strength, then block S305 may be carried out, in which the master device may transmit a first notification message to the slave device to alert the slave device that it is not permitted to join the WiFi hotspot.

In S305, when transmitted to the slave device, the first notification message may be popped up in the form of a window and used to notify the user that the slave device is permitted to be added to the WiFi hotspot.

In S306, the WiFi hotspot of the master device may be initialized to prepare for adding the slave device to the WiFi hotspot.

Initializing of the WiFi hotspot may comprise adding a new communication path and reallocating the data traffic or bandwidth.

If the master device determines the number of the slave devices connected to the WiFi hotspot doesn't exceeds the corresponding preset threshold and the signal strength is not greater than the preset signal strength, then block S307 may be entered, in which a second notification message may be transmitted to the slave device to alert the slave device that it is not permitted to join the WiFi hotspot.

In S308, the WiFi hotspot may be kept hidden from the slave device.

Additionally, in other embodiments, the current resource information may further comprise a distance of the slave device from the master device. If the signal strength of the master device is determined as greater than the preset signal strength, then the master device may further determine whether the distance is smaller than a preset distance, and if yes, block S305 may be executed; otherwise block S307 may be turned to.

Figure 4:
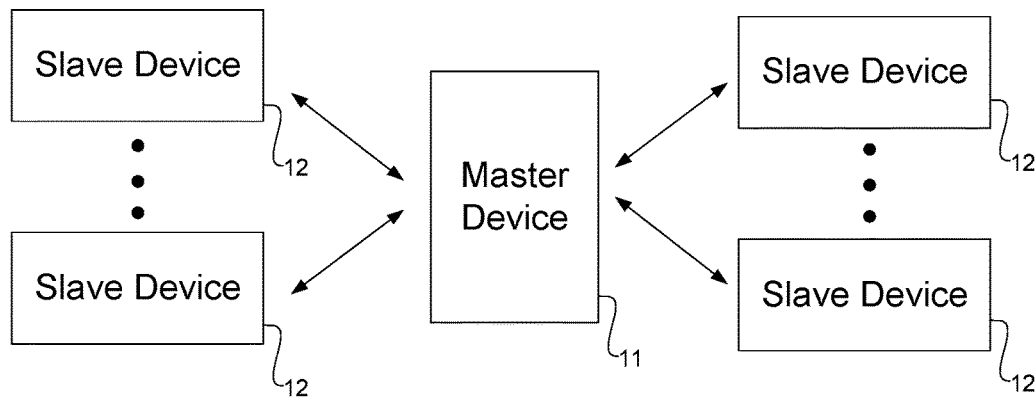
FIG. 4 shows a block diagram of an electronic device according to an embodiment of the disclosure.
Figure 5:
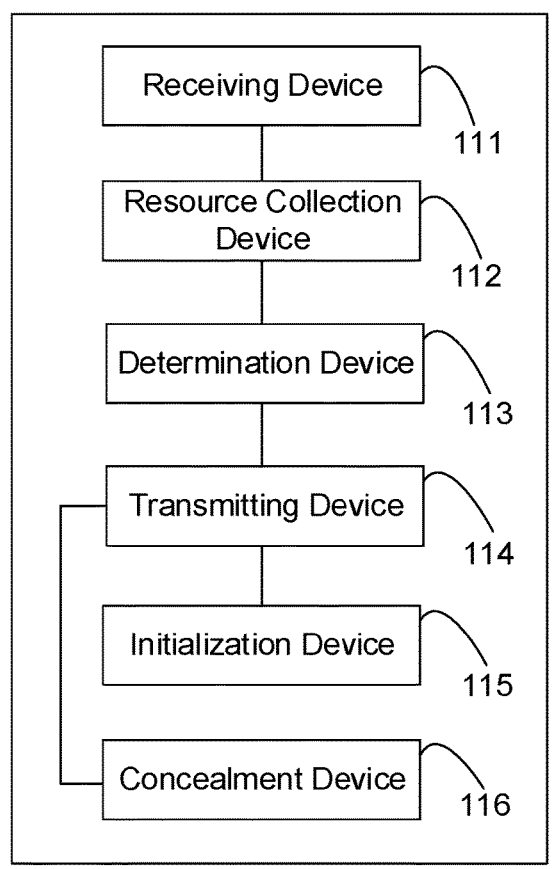
FIG. 5 shows a block diagram of a master device according to an embodiment of the disclosure.

FIG. 4 shows a block diagram of an electronic device according to an embodiment of the disclosure. The electronic device may comprise a master device 11 and at least one slave device 12. As illustrated in FIG. 5, the master device 11 may comprise a receiving device 111, a resource collection device 112, a determination device 113, a transmitting device 114, an initialization device 115, and a concealment device 116.

The receiving device 111 may be configured to receive a hotspot sharing request from a slave device 12.

The resource collection device 112 may be configured to respond to the hotspot sharing request and thus collect the current resource information of the master device 11. The current resource information of the master device 11 may comprise at least one of processing capacity of the master device 11's controller, usage of hardware resources, and processing power of the master device 11's WiFi chip. The processing capacity of the master device 11's controller may comprise at least one of the master device 11's multithreading capacity, capability utilization rate, encryption ability utilization rate, and storage usage rate. Among them, the processing power of the master device 11's WiFi chip may comprise at least one of its data throughput, packet retransmission rate, and packet delay rate. The usage of hardware resources may comprise at least one of a number of slave devices connected to the WiFi hotspot of the master device 11, temperature, battery discharge rate, signal strength of the master device 11, and a distance between the master device 11 and the slave device 12.

Figure 6:
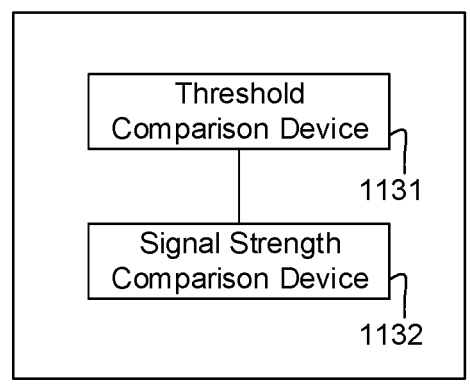
FIG. 6 illustrates a first embodiment of the determination device shown in FIG. 5.

The determination device 113 may be configured to determine base on the current resource information whether the slave device 12 is permitted to join the WiFi hotspot of the master device 11. In particular, the determination device 113 may be configured to determine whether the slave device 12 is permitted to access the WiFi hotspot based on at least one of the processing capacity of the master device 11's controller, the usage of the hardware resources, and the processing power of the master device 11's WiFi chip. As illustrated in FIG. 6, the determination device 113 may comprise a threshold comparison device 1131 typically configured to determine whether one or more values selected from among at least one of the number of the slave devices 12 connected to the WiFi hotspot, the temperature, and the battery discharge rate exceeds a corresponding preset threshold. If the threshold comparison device 1131 determines that none of the one or more selected values exceed the corresponding preset threshold, it may determine that the slave device 12 is permitted to access the WiFi hotspot. If the threshold comparison device 1131 determines that any one of the one or more selected values exceed the corresponding preset threshold, it may determine that the slave device 12 is not permitted to join the WiFi hotspot. In other embodiments, the threshold comparison device 1131 may also be configured to base on at least one of the master device 11's multithreading capacity, encryption ability utilization rate, storage usage rate, WiFi chip data throughput, WiFi chip packet retransmission rate, and WiFi chip packet delay rate to determine whether the slave device 12 is permitted to join the WiFi hotspot.

Further, the determination device 113 may comprise a signal strength comparison device 1132 configured to determine whether the signal strength of the master device 11 is greater than a preset signal strength, if none of the one or more selected values exceed the corresponding preset threshold. If determining the signal strength of the master device 11 is greater than the preset signal strength, the signal strength comparison device 1132 may determine the slave device 12 is permitted to access the WiFi hotspot. Otherwise if determining the signal strength of the master device 11 is not greater than the preset signal strength, the signal strength comparison device 1132 may determine the slave device 12 is not permitted to access the WiFi hotspot.

Figure 7:
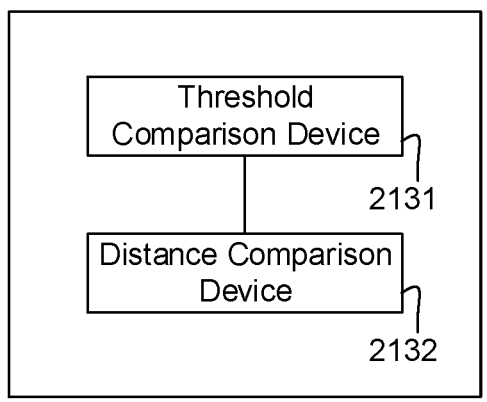
FIG. 7 illustrates a second embodiment of the determination shown device in FIG. 5.

In addition, as illustrated in FIG. 7, the determination device 113 may comprise a threshold comparison device 2131 and a distance comparison device 2132. The distance comparison device 2132 may be configured to determine whether the distance is smaller than a preset distance, if none of the one or more selected values exceed the corresponding preset threshold. If determining the distance is smaller than the preset distance, the distance comparison device 2132 may determine the slave device 12 is permitted to access the WiFi hotspot. Otherwise if determining the distance is not smaller than the preset distance, the distance comparison device 2132 may determine the slave device 12 is not permitted to access the WiFi hotspot.

Figure 8:
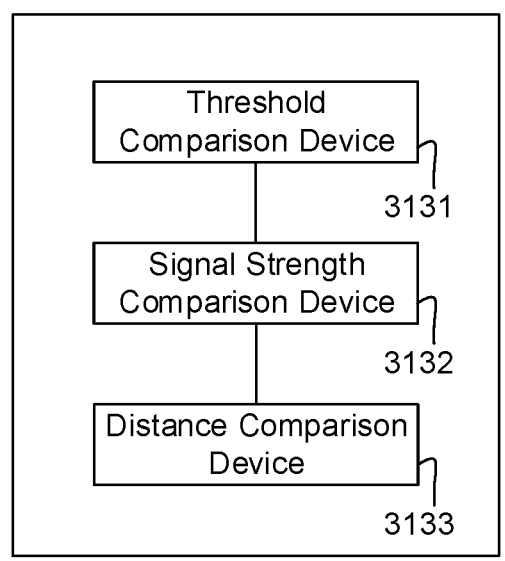
FIG. 8 illustrates a third embodiment of the determination device shown in FIG. 5.

Additionally, as illustrated in FIG. 8, the determination device 113 may comprise a threshold comparison device 3131, a signal strength comparison device 3132, and a distance comparison device 3133. The signal strength comparison device 3132 may be configured to determine whether the signal strength of the master device 11 is greater than a preset signal strength, if none of the one or more selected values exceed the corresponding preset threshold. The distance comparison device 3133 may be configured to determine whether the distance is smaller than a preset distance when the signal strength comparison device 3132 determines the signal strength of the master device 11 is greater than the preset signal strength. Or, the distance comparison device 3133 may be configured to determine whether the distance is smaller than a preset distance, if the threshold comparison device 3131 determines that none of the one or more selected values exceed the corresponding preset threshold. If the distance comparison device 3133 determines the distance is smaller than the preset distance, the signal strength comparison device 3132 may be configured to determine whether the signal strength of the master device 11 is greater than the preset signal strength.

The transmitting device 114 may be configured to transmit a first notification message to the slave device 12 to advise that it is permitted to join the WiFi hotspot of the master device 11, if the determination device 113 determines the slave device 12 is permitted to access the WiFi hotspot.

The initialization device 115 may be configured to initialize the WiFi hotspot of the master device 11 to prepare for adding the slave device 12 to the WiFi hotspot, if the determination device 113 determines the slave device 11 is permitted to access the WiFi hotspot. In particular, the initialization device 115 may be configured to add a new communication path and reallocate the data traffic and bandwidth, and further distribute an even share of data traffic and bandwidth to the slave device 12 through the newly added communication path. Or, the initialization device 115 may be configured to detect the performance of each slave device 12, and, if a superior performance is detected, i.e., less interference, then a comparatively smaller amount of data traffic or bandwidth may be allocated to the slave device 12, since the slave device 12 may be able to achieve reliable communication with a small amount of communications resources when there is less interference. In contrast, if an inferior performance is detected, i.e., a high level of interference, then a comparatively greater amount of data traffic or bandwidth may be distributed to the slave device 12, so that the slave device 12 can also achieve reliable communication with a greater amount of communications resources when there is much interference.

The transmitting device 114 may further be configured to transmit a second notification message to the slave device 12 to alert that it is not permitted to join the WiFi hotspot of the master device 11, if the determination device 113 determines the slave device 12 is not permitted to access the WiFi hotspot.

If the determination device 113 determines the slave device 12 is not permitted to access the WiFi hotspot, the concealment device 116 may be configured to hide the WiFi hotspot from the slave device 12, so that the slave device 12 may not be able to discover the WiFi hotspot in a certain period of time.

Also provided is an electronic device that comprises a master and a slave device, the master device comprising a processor, a memory, a transceiver, and a bus, where the processor, memory, and transceiver are coupled to the bus respectively, the memory may be configured to store a program, the transceiver may be configured to receive a hotspot sharing request from the slave device, and the processor may be configured to execute the program, the program being configured to:

respond to the hotspot sharing request and collect current resource information of the master device, the current resource information comprising one or more values selected from among at least one of a number of slave devices connected to the a hotspot of the master device, temperature, and battery discharge rate of the master device;

determining whether the one or more selected values exceed a corresponding preset threshold;

if none of the one or more selected values exceed the corresponding preset threshold, determine the slave device is permitted to access the WiFi hotspot, where the transceiver may further be configured to transmit a first notification message to the slave device to advise the slave device that it is permitted to join the WiFi hotspot;

initialize the WiFi hotspot to prepare for adding the slave device to the WiFi hotspot;

if any one of the one or more selected values exceed the corresponding preset threshold, determine the slave device is not permitted to access the WiFi hotspot, where the transceiver may further be configured to transmit a second notification message to the slave device to alert the slave device that it is not permitted to join the WiFi hotspot; and hide the WiFi hotspot from the slave device.

The current resource information of the master device may further comprise a signal strength of the master device, and the program may further be configured to determine whether the signal strength is greater than a preset signal strength, if none of the one or more selected values exceed the corresponding preset threshold; and if the signal strength of the master device is determined as greater than the preset signal strength, determine the slave device is permitted to access the WiFi hotspot.

The current resource information of the master device may further comprise a distance of the slave device from the master device, and the program may further be configured to determine whether the distance is smaller than a preset distance, if none of the one or more selected values exceed the corresponding preset threshold; and if the distance is determined as smaller than the preset distance, determine the slave device is permitted to access the WiFi hotspot.

The memory may comprise a USB flash disk, mobile hard drive, Read-only Memory (ROM), Random Access Memory (RAM), magnetic disk, optical disk, or any other medium that is able to store program codes. The processor may be configured to execute all or part of blocks of the methods illustrated in various embodiments of the disclosure.

As described above, according to the present disclosure the master device may detect its current resource information to determine whether it is feasible to permit the addition of a slave device, and if the slave device is permitted, may transmit in time a first notification message to advise the slave device that it is permitted to join the WiFi hotspot through which the Internet can be accessed; and if the slave device is not permitted, may transmit in time a second notification message to alert the slave device that it is not permitted to access the WiFi hotspot and simultaneously erase the WiFi hotspot on the slave device, avoiding the issue that the slave device cannot access the external network though it has apparently been connected to the WiFi hotspot, thus reducing unnecessary operations and largely improving the user experience.

Furthermore, it is apparent to those skilled in the art that the present disclosure also provides an electronic device comprising a non-transitory program storage medium and one or more processors. The non-transitory program storage medium stores a program executable by the processor(s) to perform the methods as described above.

The above description merely depicts some exemplary embodiments of the disclosure, but is not intended to limit the scope of the disclosure. Any equivalent structure or flow transformations made to the disclosure, or any direct or indirect applications of the disclosure on any other related fields, shall all be covered within the protection of the disclosure.

What is claimed is:

1. An electronic device, comprising a master and a slave device, wherein the master device comprises a processor, a memory, a transceiver, and a bus, where the processor, memory, and transceiver are coupled to the bus respectively, the memory is configured to store a program, the transceiver is configured to receive a hotspot sharing request from the slave device, and the processor is configured to execute the program, the program being configured to:

respond to the hotspot sharing request and collect current resource information of the master device, the current resource information comprising one or more values selected from among at least one of a number of slave devices connected to a WiFi hotspot of the master device, temperature, and battery discharge rate of the master device;

determine whether the one or more selected values exceed a corresponding preset threshold;

when none of the one or more selected values exceed the corresponding preset threshold, determine the slave device is permitted to access the WiFi hotspot, and the transceiver is further configured to transmit a first notification message to the slave device to advise that the slave device is permitted to join the WiFi hotspot;

initialize the WiFi hotspot to prepare for adding the slave device to the WiFi hotspot; and when any one of the one or more selected values exceed the corresponding preset threshold, determine the slave device is not permitted to access the WiFi hotspot, and the transceiver is further configured to transmit a second notification message to the slave device to alert that the slave device is not permitted to join the WiFi hotspot; and hide the WiFi hotspot from the slave device.

2. The electronic device according to claim 1, wherein to initialize the WiFi hotspot comprises the program being configured to:

add a new communication path and reallocate the total data traffic and bandwidth to distribute an even share of the data traffic and bandwidth to the slave device through the newly added communication path.

3. The electronic device according to claim 2, wherein to reallocate the total data traffic and bandwidth comprises the program being configured to:

detect performance of the slave device;

when a superior performance is detected, allocate a relatively smaller amount of the data traffic or bandwidth to the slave device; and when an inferior performance is detected, allocate a relatively larger amount of the data traffic or bandwidth to the slave device.

4. The electronic device according to claim 1, wherein the current resource information further comprises a distance of the slave device from the master device, and the program is further configured to, when none of the one or more selected values exceed the corresponding preset threshold, determine whether the distance is smaller than a preset distance; and when the distance is determined as smaller than the preset distance, determine the slave device is permitted to access the WiFi hotspot.

5. The electronic device according to claim 1, wherein the current resource information further comprises a signal strength of the master device, and the program is further configured to, when none of the one or more selected values exceed the corresponding preset threshold, determine whether the signal strength of the master device is greater than a preset signal strength; and when the signal strength is determined as greater than the preset signal strength, determine the slave device is permitted to access the WiFi hotspot.

6. The method according to claim 5, further comprising:
when determining the slave device is not permitted to access the WiFi hotspot, transmitting, by the master device, a second notification message to the slave device to alert that the slave device is not permitted to join the WiFi hotspot, and hiding the WiFi hotspot from the slave device.

7. The method according to claim 5, wherein the determining whether the slave device is permitted to access the WiFi hotspot comprises:
determining, by the master device, whether each of the one or more selected values exceed a corresponding preset threshold; and
when none of the one or more selected values exceed the corresponding preset threshold, determining that the slave device is permitted to access the WiFi hotspot.

8. The method according to claim 7, wherein the preset threshold comprises a preset numeral threshold that corresponds to a number of the slave devices connected to the master device and is associated with a data traffic and bandwidth plan the master device subscribes to.

9. The method according to claim 7, wherein the current resource information further comprises a signal strength of the master device, the method further comprising, after determining that none of the one or more selected values exceed the corresponding preset threshold:
determining, by the master device, whether the signal strength is greater than a preset signal strength; and
when the signal strength is determined as greater than the preset signal strength, determining the slave device is permitted to access the WiFi hotspot.

10. The method according to claim 7, wherein the current resource information further comprises a distance of the slave device from the master device, and the method further comprises, after determining that none of the one or more selected values exceed the corresponding preset threshold:
determining, by the master device, whether the distance is smaller than a preset distance; and
when the distance is determined as smaller than the preset distance, determining the slave device is permitted to access the WiFi hotspot.

11. A method of sharing a WiFi hotspot, the method comprising:
receiving, at a master device, a hotspot sharing request from a slave device;
responding, by the master device, to the hotspot sharing request and collecting its current resource information, the current resource information comprising one or more values selected from among at least one of a number of slave devices connected to the WiFi hotspot of the master device, temperature, and battery discharge rate of the master device;
determining, by the master device, whether the slave device is permitted to access the WiFi hotspot based on the current resource information; and
when determining the slave device is permitted to access the WiFi hotspot, transmitting, by the master device, a first notification message to the slave device to advise that the slave device is permitted to join the WiFi hotspot, and initializing the WiFi hotspot to prepare for adding the slave device to the WiFi hotspot.

12. The method according to claim 11, wherein the initializing the WiFi hotspot comprises:
adding a new communication path and reallocating the total data traffic and bandwidth to distribute an even share of the data traffic and bandwidth to the slave device through the newly added communication path.

13. The method according to above claim 12, wherein the reallocating the total data traffic and bandwidth comprises:
detecting performance of the slave device;
when a superior performance is detected, allocating a relatively smaller amount of the data traffic or bandwidth to the slave device; and
when an inferior performance is detected, allocating a relatively larger amount of the data traffic or bandwidth to the slave device.

14. An electronic device, comprising a master and a slave device, wherein the master device comprises a memory storing a plurality of programs and one or more processors that execute one or more operations for the plurality of programs, the plurality of programs comprising:
a receiving device configured to receive a hotspot sharing request from the slave device;
a resource collection device configured to respond to the hotspot sharing request and collect current resource information of the master device, the current resource information comprising one or more values selected from among at least one of a number of slave devices connected to a WiFi hotspot of the master device, temperature, and battery discharge rate of the master device;
a determination device configured to determine, based on the current resource information, whether the slave device is permitted to access the WiFi hotspot;
a transmitting device configured to transmit a first notification message to the slave device to advise that the slave device is permitted to join the WiFi hotspot, when the determination device determines the slave device is permitted to access the WiFi hotspot; and
an initialization device configured to initialize the WiFi hotspot to prepare for adding the slave device to the WiFi hotspot.

15. The electronic device according to claim 14, wherein the initialization device is configured to:
add a new communication path and reallocate the total data traffic and bandwidth to distribute an even share of the data traffic and bandwidth to the slave device through the newly added communication path.

16. The electronic device according to claim 15, wherein the initialization device is configured to:
   detect performance of the slave device;
   when a superior performance is detected, allocate a relatively smaller amount of the data traffic or bandwidth to the slave device; and
   when an inferior performance is detected, allocate a relatively larger amount of the data traffic or bandwidth to the slave device.

17. The electronic device according to claim 14, further comprising a concealment device, wherein when the determination device determines the slave device is not permitted to access the WiFi hot spot, the transmitting device is further configured to transmit a second notification message to the slave device to alert that the slave device is not permitted to join the WiFi hotspot; and
   the concealment device is configured to hide the WiFi hotspot of the master device from the slave device.

18. The electronic device according to claim 14, wherein the determination device comprises a threshold comparison device configured to:
   determine whether each of the one or more selected values exceed a corresponding preset threshold; and
   when none of the one or more selected values exceed the corresponding preset threshold, determine the slave device is permitted to access the WiFi hotspot.

19. The electronic device according to claim 18, wherein the current resource information further comprises a signal strength of the master device, and the determination device further comprises a signal strength comparison device configured to, when none of the one or more selected values exceed the corresponding preset threshold, determine whether the signal strength of the master device is greater than a preset signal strength; and
   when the signal strength of the master device is determined as greater than the preset signal strength, determine the slave device is permitted to access the WiFi hotspot.

20. The electronic device according to claim 18, wherein the current resource information further comprises a distance of the slave device from the master device, and the determination device further comprises a distance comparison device configured to, when none of the one or more selected values exceed the corresponding preset threshold, determine whether the distance is smaller than a preset distance; and
   when the distance is determined as smaller than the preset distance, determine the slave device is permitted to access the WiFi hot spot.

* * * * *